(12) United States Patent
Yonemoto et al.

(10) Patent No.: US 11,322,738 B2
(45) Date of Patent: May 3, 2022

(54) METHOD FOR PREPARING CATHODE PARTICLES AND CATHODE ACTIVE MATERIALS HAVING SAME

(71) Applicant: Microvast Power Systems Co., LTD., Huzhou (CN)

(72) Inventors: Bryan Yonemoto, Clearwater, FL (US); Xiao Zhang, Huzhou (CN)

(73) Assignee: MICROVAST POWER SYSTEMS CO., LTD., Huzhou (CN)

( * ) Notice: Subject to any disclaimer, the term of this patent is extended or adjusted under 35 U.S.C. 154(b) by 308 days.

(21) Appl. No.: 16/378,554

(22) Filed: Apr. 8, 2019

(65) Prior Publication Data
US 2019/0312265 A1    Oct. 10, 2019

Related U.S. Application Data

(60) Provisional application No. 62/654,486, filed on Apr. 8, 2018.

(51) Int. Cl.
| | |
|---|---|
| *H01M 4/36* | (2006.01) |
| *H01M 10/0525* | (2010.01) |
| *H01M 4/525* | (2010.01) |
| *H01M 4/48* | (2010.01) |
| *C01G 53/00* | (2006.01) |
| *H01M 4/505* | (2010.01) |
| *H01M 4/02* | (2006.01) |

(52) U.S. Cl.
CPC ............ *H01M 4/364* (2013.01); *C01G 53/44* (2013.01); *H01M 4/483* (2013.01); *H01M 4/505* (2013.01); *H01M 4/525* (2013.01); *H01M 10/0525* (2013.01); *C01P 2006/40* (2013.01); *H01M 2004/028* (2013.01)

(58) Field of Classification Search
CPC .............................. H01M 4/525; H01M 4/364
See application file for complete search history.

(56) References Cited

U.S. PATENT DOCUMENTS

2012/0080649 A1    4/2012    Koenig, Jr. et al.

FOREIGN PATENT DOCUMENTS

CN            103326016 A        9/2013

*Primary Examiner* — Peter F Godenschwager
(74) *Attorney, Agent, or Firm* — Cheng-Ju Chiang

(57) ABSTRACT

The invention relates to a method for preparing cathode particles under a co-precipitation reaction by feeding NaOH and metal sulfate solution into different vessels. The invention further provides a cathode active material having the cathode particles. By the method of the invention, the number density distribution of prepared particles is much smaller than feeding NaOH and metal sulfate together into same vessel.

18 Claims, 3 Drawing Sheets

METHOD FOR PREPARING CATHODE PARTICLES AND CATHODE ACTIVE MATERIALS HAVING SAME

CROSS REFERENCE TO RELATED APPLICATION

This application is based on and claims priority of U.S. Provisional Patent Application No. 62/654,486 filed on Apr. 8, 2018. The contents of the above-identified applications are incorporated herein by reference.

TECHNICAL FIELD

The present disclosure relates to a method for preparing particles that can be used as cathodes for Li-ion batteries, and cathode active materials having same.

BACKGROUND

The lithium-ion battery, originally commercialized in early 1990s, has come to dominate the energy storage market for hand-held, electronic consumer devices. This is because the battery is rechargeable and has high mass and volume energy density. Lithium-ion batteries are still being extensively investigated for electric vehicle applications currently. In electric vehicles, an ideal battery cathode would have high capacity, high power, improved safety, long cycle life, low toxicity and lower production costs. However, current cathode materials fail to meet all these requirements.

To improve the stability of layered $LiNiO_2$, additional transition metals such as Mn—Co or Co—Al can substitute Ni therein to produce certain cathode materials known as NMC or NCA. By substituting the amount of Ni present in the layered $LiNiO_2$ structure by additional transition metals, safety and cycle life of the batteries can be improved. However, such solution is realized at the expense of available energy storage.

To solve such problems above, one method proposed to provide cathodes with high energy density and improved safety is to make particles with compositional variation between the center of the material—typically Ni rich for high energy density—and the surface of the material—typically Mn or Al rich for higher safety. To create compositional variation between the particle interior and the surface, cathode precursors can be prepared via coprecipitation to yield multilayer particles as described in CN103326016 or concentration gradient particles as described in US20120080649.

During batch or semi-batch preparation commonly for NMC, NCA, core-multilayer or concentration gradient material, it is desirable to control the particle number density during preparation. The particle number density has a direct impact on the particle sets density and particle growth behavior during reactive crystallization. Since concentration gradient materials are mainly based on Ni—Mn—Co—Al lithium oxides, it is particularly challenging to control the particle number density during reactive crystallization because the precipitation has complex kinetics due to the addition of a metal chelator, typically ammonia, into the solution. Within a stirred vessel, the local concentrations, mixing power, blend time, and feed locations would all impact the number density distribution of the cathode active materials yielded.

SUMMARY

The present disclosure provides a method for preparing cathode particles, during which a number density distribution of the cathode particles could be controlled. Meanwhile, the present disclosure provides cathode active materials having the cathode particles prepared by the method above. Besides, the present disclosure further provides a method to adjust a tap density of the yielded cathode active materials.

In the embodiments of the present disclosure, the cathode particles are prepared under a co-precipitation reaction, and the solution volume where the reaction takes place is defined as a precipitation zone.

The precipitation zone is evacuated and filled with He, $N_2$ or Ar gas, for example blanketed or bubbled thereby. Further, the precipitation zone includes the following streams: ($a_i$) a feed stream providing the precipitate cations, ($b_i$) a feed stream providing the precipitate anions, (c) the precipitation particle slurry, and ($d_i$) an optional inlet stream for providing chelating agents. Besides, additional streams (e)-(z) may also be applied in order to add additional species to the precipitation zone or to remove solvent through an in-situ thickening device.

Each precipitation zone volume is defined as the volume of a single mixed vessel or the sum of a number of processing vessels, pumps, or solid-liquid thickening devices connected in parallel.

The precipitation zone can generally be described by the following mass balance equation:

$$\frac{d(\rho_a V)}{dt} = \sum_{a=\alpha}^{x} F_a \rho_a,$$

wherein the inlet/outlet streams a represents for the "a" to "z" above, ρa represents for a fluid density thereof, V represents for the precipitation zone volume, Fα represents for the volumetric flowrate. $\rho_\alpha$ represents for a density of the inlet streams; $\rho_c$ represents for a density of the accumulating fluid in the reactor which changes with time. $\rho_\alpha$ is the fluid density of the reactor, and will be the feed density, we can say $\rho_\alpha$ is assumed as the density of the inlet streams.

To prepare the cathode particles, a semi-batch precipitation zone is provided, wherein at least two mixed vessels exist in parallel communication via re-circulation of the fluids between the parallel vessels. FIGS. 1-4 show the schematic configurations of the vessels, but it should be understood by one skilled in the art that other configurations of multiples of parallel tanks are also suitable herein.

In some configurations, at least one of the parallel mixed vessels is only partially filled at the start of the reaction and will continue to be filled as the reaction proceeds. In this situation the reaction ends once the volume final is reached.

In some configurations, an outflow or reactor volume may exist during all or part of the reaction period. This outflow would be collected separately to yield the final cathode active particles; or would undergo a separation operation, after that, a significant portion of the particles would precipitate from the cumulative reaction volume to obtain a solid-liquid mixture, such solid-liquid mixture would be further refed into the reactor through a stream with higher particle mass density than original outflow stream.

FIG. 5 shows a schematic view of a representative example of this configuration, particularly shows a schematic view of reactors in parallel, wherein vessel A starts with partially filled or fully filled, and vessel B starts with fully filled. Once agitated, the materials in vessel A of this configuration would turn into full slurry, which would flow out of vessel A and be collected or filtered via a solid-liquid separation device. The separation device may be a plate and frame filter, candlestick filter, centrifuge, vacuum drum filter, pressure drum filter, hydrocyclone, Nutsche filter, clarifier or some combination of devices.

The parallel mixed vessels combine with each other to form the precipitation zone which have the same volume, or different volume with the ratio being 1 to 1 million, and the agitation strength which is reflected by a tip speed, a rotation per minute, an impeller torque or a mixing time can be equal or different between the mixing vessels.

In one embodiment, the parallel mixing vessels are not the same size, and one of the vessels experiences significantly stronger mixing than another, as is reflected by the stirring time and rpm of the impeller. The multiple mixing vessels, for example, two vessels in parallel configuration, are well mixed and have a Reynolds number (Re) higher than 6,400, with a stirring time of 0-1,200 seconds, for example, 0-120 seconds, or 0-45 seconds.

In one embodiment, a temperature of the precipitation zone is maintained between 30° C. and 800° C. In another embodiment, the temperature of the precipitation zone is between 45° C. and 600° C.

In one embodiment, a pH of each precipitation zone is maintained at a range of 7 to 13. In another embodiment which precipitating hydroxides, the pH of each precipitation zone is at a range of 10.5 to 12. In still another embodiment which precipitating carbonates, the pH value of each precipitation zone is at a range of 8.5 to 10.

In one embodiment, the stream ($a_i$) containing the cations for precipitation has a concentration of 0.001-6 mol cation/L, and the metal cations is at least one selected from the group consisting of Mg, Ca, Ti, V, Cr, Mn, Fe, Co, Ni, Cu and Al. The anions corresponding to the metal cations above are at least one selected from the group consisting of sulfate, carbonate, chloride, nitrate, fluoride, oxide, hydroxide, oxyhydroxide, oxalate, carboxylate, acetate, phosphate and borate.

The feed composition of $a_1$ and $a_2$ cation ratios of $Ni_x Mn_y Co_z Me_{1-x-y-z}$ where $x+y+z \geq 0.9$, $z \leq 0.4$, and Me represents for one or more additional elements. In one embodiment, when using $OH^-$ and $CO_3^{2-}$ as the precipitation agents, under these feed conditions above, a precipitated particle of the form $(Ni_x Mn_y Co_z Me_{1-x-y-z})(CO_3)_a(OH)_{2-2a}$ will be collected after a time $t_f$. For example, in one embodiment, $a_1$ is selected from $0.85 \leq x_1 \leq 1$; $0 \leq z_1 \leq 0.1$. For another example, in another embodiment, $a_2$ is selected from $0.4 \leq x_2 \leq 0.7$; $0.25 \leq y_2 \leq 0.5$.

In one embodiment, the nominal value of x in prepared particle and final active material is in a range of $0.6 \leq x \leq 0.95$. In another embodiment, the nominal value of x is in a range of $0.75 \leq x \leq 0.9$.

Stream ($b_i$), containing the anions for precipitation, has a concentration at a range of 0.001-14 mol anion/L. The anion in the stream ($b_i$) is at least one selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$ or some combination of the species listed above.

Stream ($d_i$), containing chelating agent to the reaction zone, which has a concentration of the chelating agent in a range of 0.001-14 mol chelating agent/L. The chelating agent is at least one selected from the group consisting of ammonia hydroxide, ammonium chloride, ammonium sulfate, ammonium dihydrogen phosphate, ethylene glycol, carboxylic acids, ammonium nitrate, glycerol, 1,3 propanediol, urea, N,N'-dimethylurea and quaternary ammonia salts, or some combination.

Stream (e-z) may contain additional solvents, surface acting agents, de-foaming agents, or dopants. For dopants, since they become part of the final product, the total concentration of dopant species should be less than 5% of the mol % of the final material.

The slurry from the precipitation zone is collected in a hold-up tank or directly fed into a solid-liquid filtration device. The filtration device may be a plate and frame filter, candlestick filter, centrifuge, vacuum drum filter, pressure drum filter, hydrocyclone, Nutsche filter, clarifier or some combination of devices. The filtered precipitated particles must be washed to remove byproduct salts from the precipitation reactions.

The filtered precipitated particles (i.e., filter cake) is then dried under vacuum and at $N_2$, Ar or air atmosphere for 3-24 hours at a temperature between 80° C. and 2000° C.

Once dried, the particles are contacted with a lithium precursor and well mixed therewith. The lithium precursor is at least one selected from the group consisting of $LiOH.H_2O$, $Li_2CO_3$, $LiNO_3$, lithium acetate, lithium metal and $Li_2O$. In one embodiment, lithium hydroxide is used. In another embodiment, lithium carbonate is applied. In one embodiment, a ratio of Li to metal cation is between 0.5-1.5. In another embodiment, the ratio of Li to metal cation is between 0.9-1.15. In still another embodiment, the ratio of Li to metal cation is between 1.01-1.10.

The well mixed lithium source and precipitated particles are then calcined at a temperature between 300-9500° C., and multiple other temperatures and ramp rates may also be used. In one embodiment, the lithium source and precipitated particles are firstly calcined at a temperature of 300-5000° C. for 2-20 hours, and then heated at a temperature of 7000° C. to 8500° C. for 2-20 hours. In one embodiment, the ramp rate during calcining is 0.5 to 10 degrees per minute. In another embodiment, the ramp rate during calcining is 2 to 5 degrees per minute. In one embodiment, a time of the calcination is 2 to 48 hours.

The calcination atmosphere is at least one selected from the group consisting of $N_2$, air, dried air and oxygen, or any combination of the above. The reaction temperature is critical for concentration gradient materials, since too high, too long, or a combo of the two may cause so much cation diffusion that a gradient is no longer present in the final cathode particle.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Example 1

Preparing a mixed metal sulfate solution whose concentration being 2M: Firstly, preparing a first metal sulfate (MSO$_4$, M represents for metals Ni, Mn, Co) solution whose concentration being 2M and a metal mole ratio Ni:Mn:Co being 0.65:0.25:0.1; preparing a second metal sulfate solution whose concentration being 2M and a metal mole ratio Ni:Mn:Co being 0.9:0:0.1. Secondly, placing the metal sulfate (MSO$_4$) solutions in series, feeding the Ni-rich second metal sulfate solution into the precipitation zone defined above, feeding the first metal sulfate solution into the precipitation zone to mix with the second metal sulfate solution to form a mixed metal sulfate solution, whose concentration still being 2M.

Figure 1:
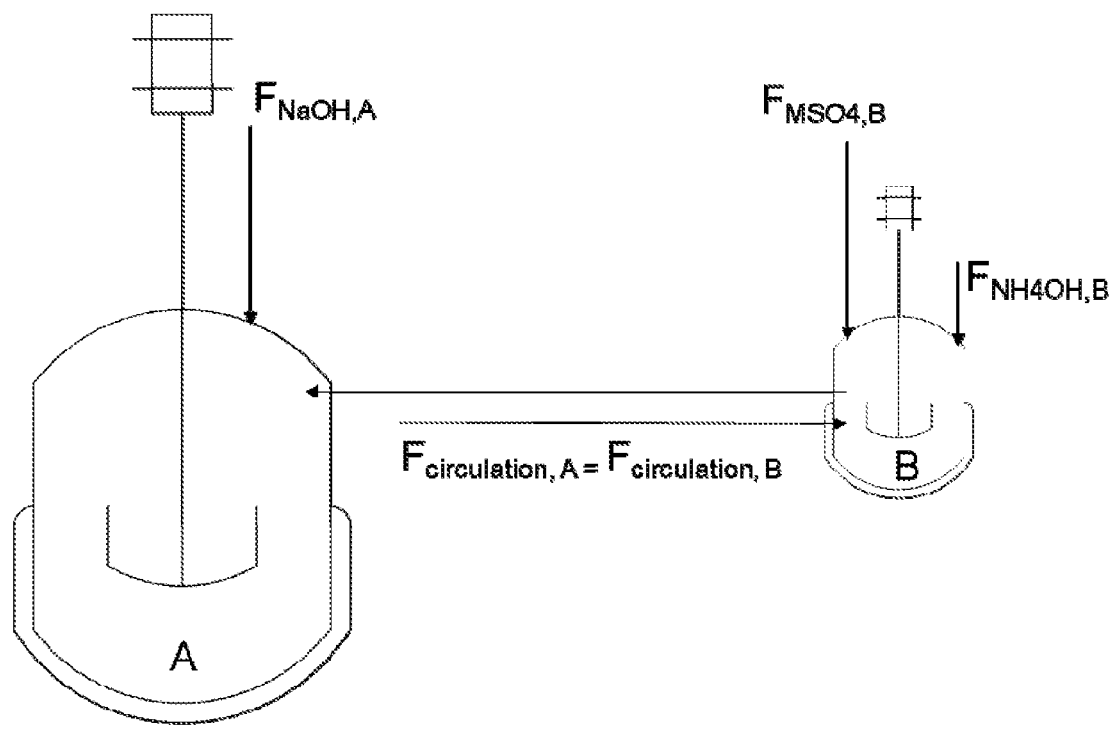
FIG. 1 shows a schematic view of reactors in parallel according to Example 1 of the present disclosure, wherein vessel A starts partially filled and vessel B starts fully filled, the fluids recirculate between vessels A and B as a flow of NaOH is fed to vessel A and flows of $MSO_4$ and $NH_4OH$ are fed into vessel B.

Preparing a NH$_4$OH solution whose concentration being 10M: As shown in FIG. 1, providing a 4 L stainless steel agitated vessel B and a 20 L glass agitated vessel A. After that, filling the vessel B with 3.5 L of NH$_4$OH solution whose concentration being 0.7M and stirring the solution at 1,000 rpm; filling the vessel A with 5 L of NH$_4$OH whose concentration being 0.7M and stirring the solution at 300 rpm. And then, heating both vessels A and B to 500° C. Next, setting two peristaltic pumps at 380 mL/min and transporting the fluids from vessel A to vessel B and from vessel B to vessel A by the pumps. Once confirming that the recirculation flow is stable, and the two interconnecting streams are equal, starting the reaction. At this stage, the concentration of the NH$_4$OH solution reaches 10M.

Feeding the 2M mixed metal sulfate solution continuously into the vessel B (4 L) at a flow rate of 0.35 L/hr, feeding the 10M NH$_4$OH solution into vessel B at 0.035 L/hr, and feeding 10.8M NaOH into vessel A (20 L), wherein NaOH is fed via controller to maintain a reaction pH at 11.9 (when measured at room temperature). After that, reacting for 22.8 hrs.

After the reaction was stopped, collecting the concentration gradient precursor particles from both vessels, and mixing the particles from both vessels together. And then, filtering and washing the particles with copious amounts of DI water using a large Buchner filter. After that, drying the collected particles at 1000° C. overnight in a N$_2$ atmosphere. Next, mixing the dried particles with LiOH.H$_2$O at a Li:M ratio of 1.03:1, wherein M represents for Ni—Mn—Co.

Finally, calcining in an oxygen atmosphere at 8000° C. In this way, cathode active materials are yielded, which having the particles prepared.

Example 2

Figure 3:
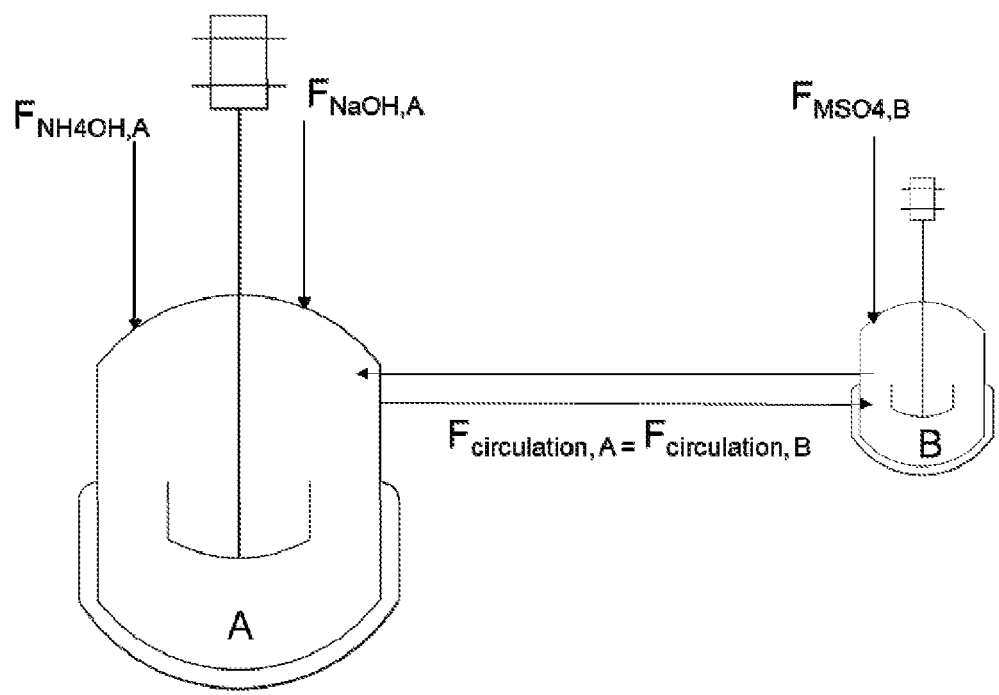
FIG. 3 shows a schematic view of reactors in parallel according to Example 2 of the present disclosure, wherein vessel A starts partially filled and vessel B starts fully filled, the fluids recirculate between vessels A and B as flows of NaOH and $NH_4OH$ are fed into vessel A and a flow of $MSO_4$ is fed into vessel B.

The conditions used in example 2 is similar as that in example 1, except that the NH$_4$OH feed stream was fed to the vessel A (20 L) instead of the vessel B (4 L). As shown in FIG. 3, the fluids recirculate between vessels A and B as flows of NaOH and NH$_4$OH are fed into vessel A, while a flow of and MSO$_4$ is fed into vessel B. Vessel A starts partially filled, while vessel B starts fully filled.

Example 3

Figure 4:
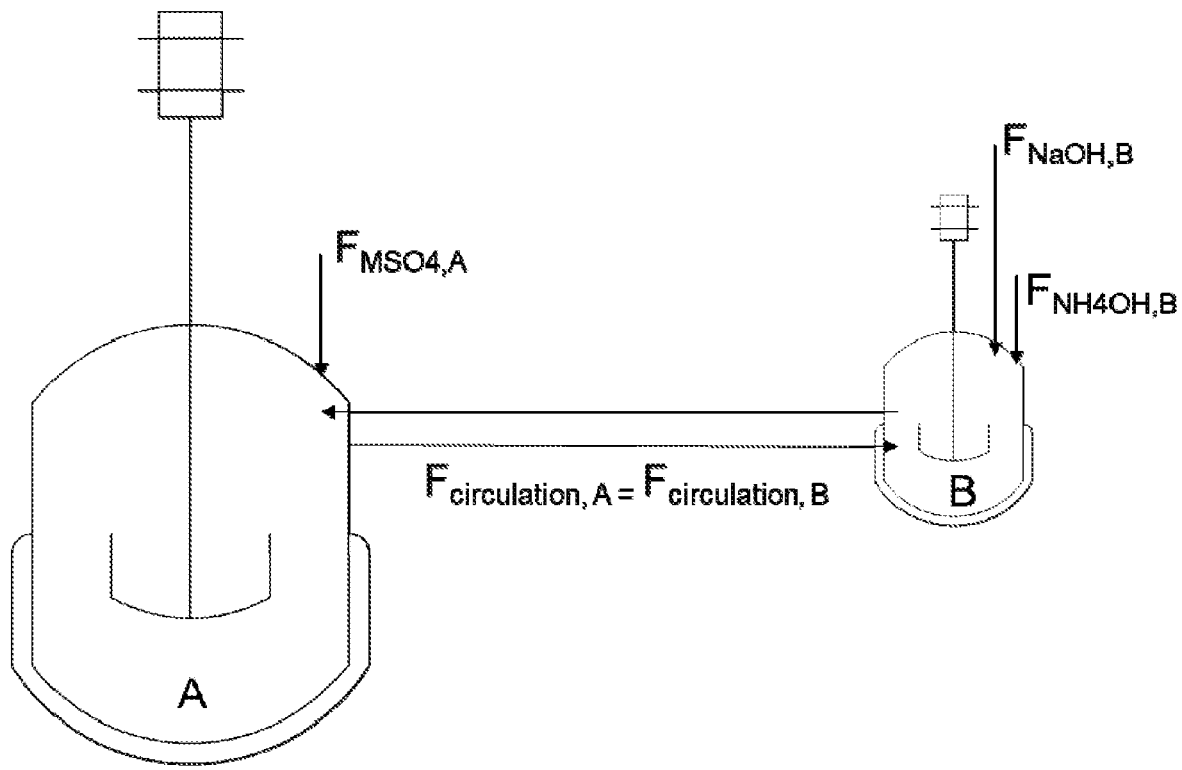
FIG. 4 shows a schematic view of reactors in parallel according to Example 3 of the present disclosure, wherein vessel A starts partially filled and vessel B starts fully filled, the fluids recirculate between vessels A and B as a flow of MSO$_4$ is fed into vessel A and flows of NH$_4$OH and NaOH are fed into vessel B.
Figure 5:
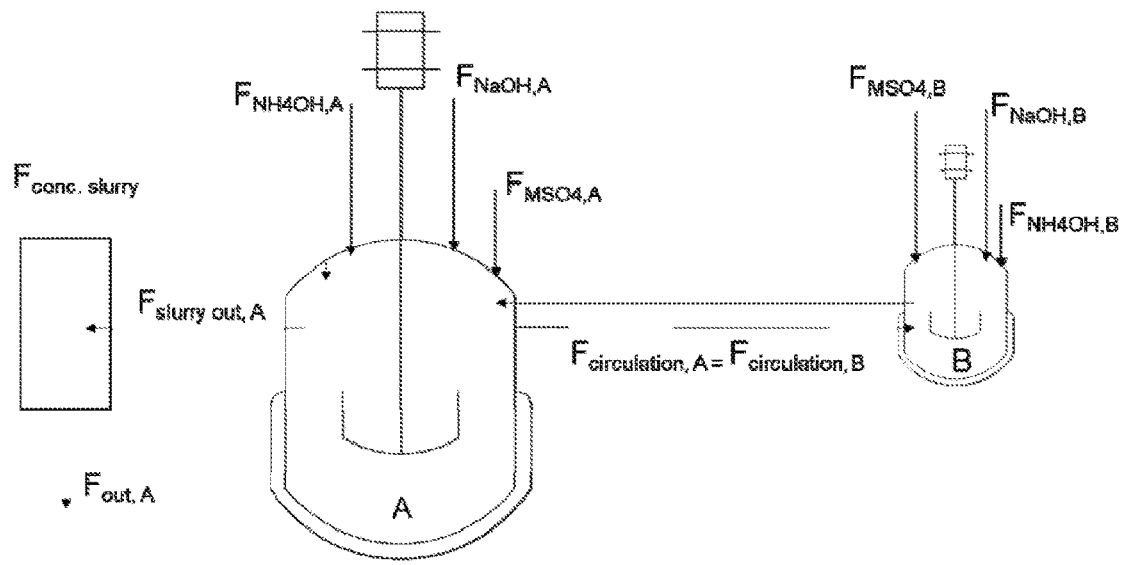
FIG. 5 shows a schematic view of reactors in parallel according to example 5, wherein vessel A starts partially filled or fully filled, while vessel B starts filled, the feed streams containing NaOH, MSO$_4$ and NH$_4$OH could be added to vessel A, B or both.

The conditions used in example 3 is similar as that in example 1, except that the MSO$_4$ feed stream was fed to the 20 L, and the NaOH was fed to the 4 L. As shown in FIG. 4, the fluids recirculate between vessels A and B as a flow of MSO$_4$ was fed into vessel A, while flows of NH$_4$OH and NaOH were fed into vessel B. Vessel A starts partially filled, while vessel B starts filled.

Example 4

Figure 2:
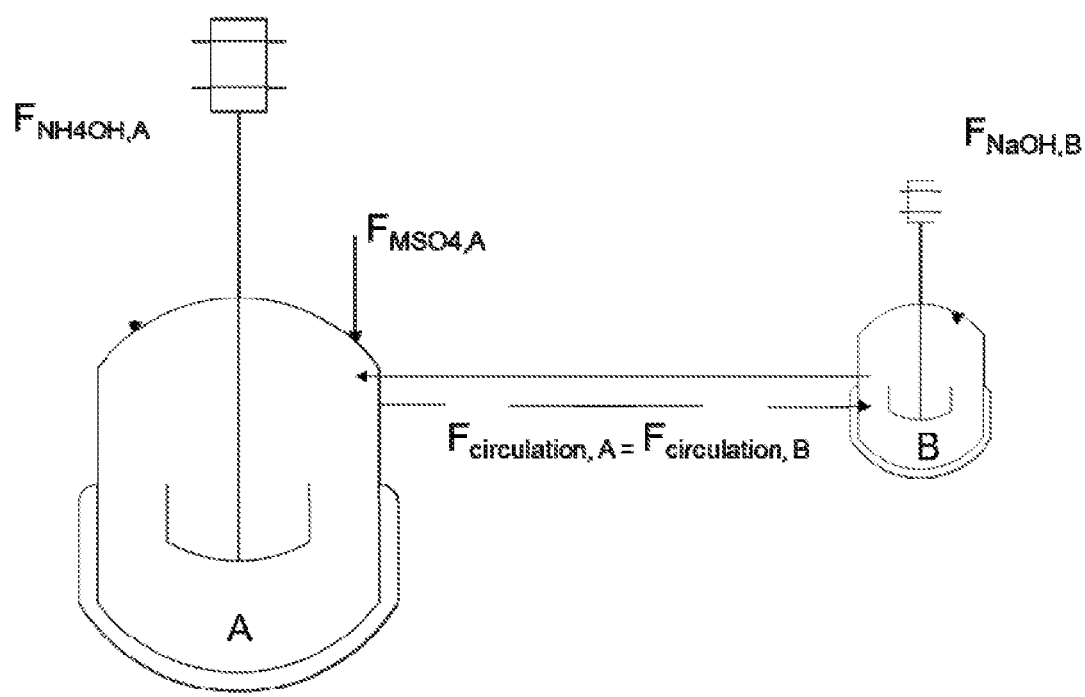
FIG. 2 shows a schematic view of reactors in parallel according to Example 4 of the present disclosure, wherein vessel A starts partially filled and vessel B starts fully filled, the fluids recirculate between vessels A and B as flows of $NH_4OH$ and $MSO_4$ are fed into A and a flow of NaOH is fed into B.

The conditions used in example 4 is similar as that in example 1, except that flows of MSO$_4$ and NH$_4$OH feed streams were fed to vessel A (20 L), and a flow of NaOH was fed to vessel B(4 L), as shown in FIG. 2.

Comparative Example 1

The conditions used in comparative example 1 is similar as that in example 1, except that vessel A (20 L glass reactor) was firstly filled with 5 L of 0.7M NH$_4$OH and heated to 500° C. while mixing at 300 rpm, and then the NaOH, MSO$_4$ and NH$_4$OH feed streams, with compositions and flowrate identical to example 1, were fed into the vessel A for the same amount of time as example 1. Once the precipitation finished, collecting the particles, filtering and drying the particles using the same conditions as in example 1.

Characterization of Particles

A tap density was tested by the following steps: loading 20 g of cathode active material into a 25 mL graduated cylinder, and then tapping the cylinder 2000 times at 250/min speed on a tap density instrument.

A particle number distribution was collected on an Mastersizer 2000 laser particle size analyzer. About 2 g sample was first pre-disper 5 min by a dispersant with 1 ultrasonic, then disper in 1000 ml water. After that, the particle number distribution was tested.

Figure 6:
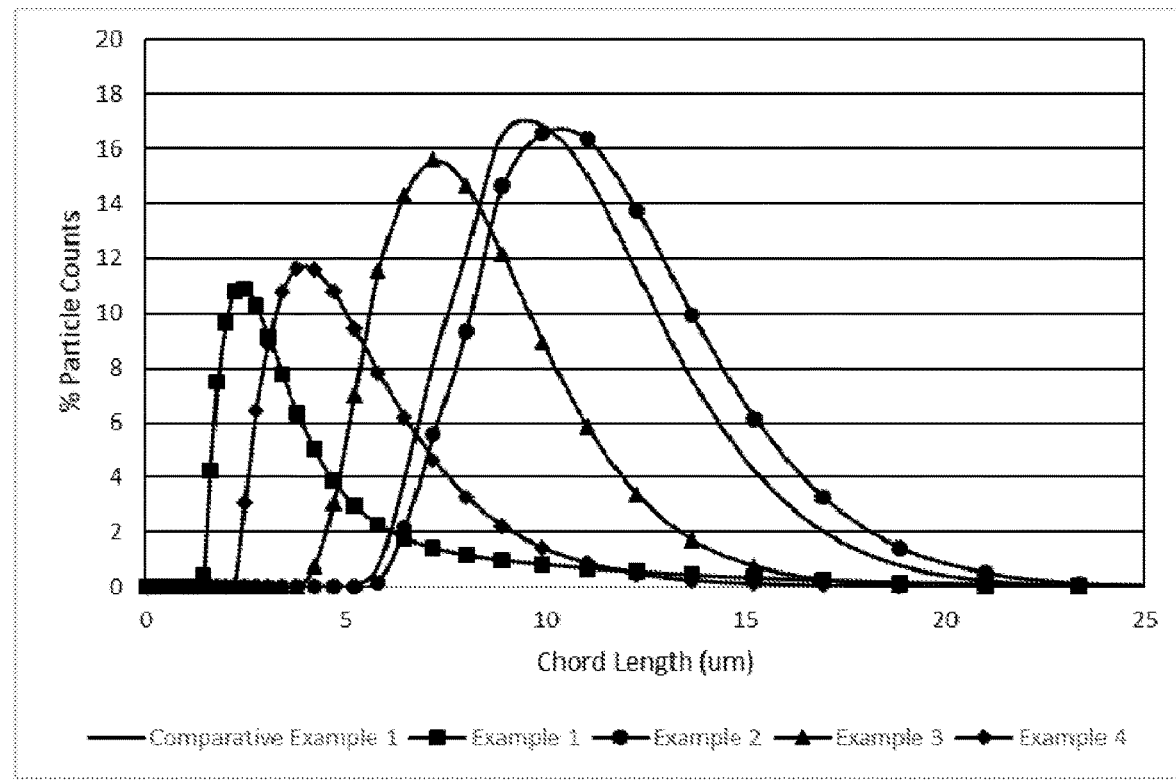
FIG. 6 shows particle number distribution of examples 1-4 and comparative example 1.

FIG. 6 shows the particle number distributions of Examples 1-4 and comparative example 1. Table 1 shows the obtained tap density, particle number D50 and particle size D50 of examples 1-4 and comparative example 1.

TABLE 1

|  | Particle Number D50 (μm) | Tap Density (g/cc) | Particle Size D50 (μm) |
| --- | --- | --- | --- |
| Example 2 | 10.03 | 2.45 | 12.29 |
| Comparative Example 1 | 9.39 | 2.38 | 11.48 |
| Example 3 | 7.10 | 2.26 | 9.09 |
| Example 1 | 2.64 | 2.21 | 12.55 |
| Example 4 | 4.12 | 1.96 | 6.8 |

The comparison above shows that through the proposed method above, the number density distribution of prepared particles is controlled to be below 15 µm, in one embodiment, the number density distribution of the particles is below 10 µm; in another embodiment, the number density distribution of the particles is below 5 µm. In one embodiment, the final active material particles have a tap density in a range of 1-3 g/cc. In another embodiment, the final active material particles have a tap density in a range of 1.5-2.7 g/cc.

Further, using the present procedure, the number density D50 can be decreased by 1-1000 times by feeding a flow of NaOH stream and flows of $MSO_4$ and $NH_3$ streams into various combinations of two agitation vessels. Under these conditions, a large decrease in the number density distribution occurs, as shown by FIGS. 1-6. The tap density of the final active material is also decreased by 33-100% under these processing conditions.

The proposed effect is most prominent when the flows of $MSO_4$ and $NH_3$ are fed into the weaker agitated vessel A, and NaOH is fed to the stronger agitated vessel B in the parallel configuration, as shown in the results of example 4.

Meanwhile, by using the present process, the particle number density D50 can be changed by 0.01-3 times when the NaOH stream is fed to the lesser agitated vessel A and the $MSO_4$ is fed to the stronger agitated vessel B. The $NH_3$ can be delivered to either vessel. By separating the NaOH and $MSO_4$ steam, particle growth via agglomeration will occur. Referring to examples 1 and 2.

FIG. 6 and Table 1 show that comparing with a method wherein NaOH, $MSO_4$ and $NH_4OH$ are fed simultaneously into same vessel(s), feeding NaOH and $MSO_4$ into different vessels would yield a larger number of smaller particles except when both NaOH and $NH_3OH$ are fed into same vessel.

It should be noted that the data of example 2 shows a way to control the particle number distribution larger. What we are really trying to do is manipulate the number density lower, because we expect that to make more broad packed electrodes. However, example 2 is a condition tested, and the result of it going higher could be needed if a reaction base case was too small.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing cathode particles under a co-precipitation reaction, comprising the following steps:
    providing a first vessel and a second vessel connected in parallel, the first vessel and the second vessel where a reaction takes place is defined as a precipitation zone;
    feeding stream (ai) solution into one vessel, feeding stream (bi) solution into the other vessel, and feeding stream (di) into either of the vessels;
    re-circulating the solutions between the first vessel and the second vessel to cause a reaction;
    after reacting between the solutions, concentration gradient precursor particles being formed in both vessel, collecting the concentration gradient precursor particles from both vessels;
    filtering, washing and drying the particles;
    after drying, mixing the dried particles with a lithium precursor; and
    calcining to yield the cathode particles.

2. The method of claim 1, wherein the first vessel is larger than the second vessel, or both have same volume.

3. The method of claim 1, wherein a Reynolds number of the vessels is higher than 6400 with a stirring time of 0-1,200 seconds.

4. The method of claim 1, wherein during reaction, a temperature of the precipitation zone is between 30-800° C.

5. The method of claim 1, wherein a pH of the precipitation zone is at a range of 7 to 13.

6. The method of claim 1, wherein the stream (ai) comprises cations for precipitation, and has a concentration of 0.001-6 mol cation/L.

7. The method of claim 1, wherein steam ($a_i$) comprises at least one metal cation, the at least one metal cation of stream ($a_i$) is at least one selected from the group consisting of Mg, Ca, Ti, V, Cr, Mn, Fe, Co, Ni, Cu and Al.

8. The method of claim 7, wherein anions corresponding to the metal cations are at least one selected from the group consisting of sulfate, carbonate, chloride, nitrate, fluoride, oxide, hydroxide, oxyhydroxide, oxalate, carboxylate, acetate, phosphate and borate.

9. The method of claim 1, wherein stream (ai) comprises $Ni_xMn_yCo_zMe_{1-x-y-z}$ where $x+y+z\geq 0.9$, $z\leq 0.4$, and Me represents additional elements.

10. The method of claim 1, wherein stream ($b_i$) comprises anions for precipitation, and has a concentration at a range of 0.001-14 mol anion/L.

11. The method of claim 10, wherein the anion in stream ($b_i$) is at least one selected from the group consisting of $OH^-$, $CO_3^{2-}$, $HCO_3^-$ and $C_2O_4^{2-}$.

12. The method of claim 1, wherein stream ($d_i$) comprises a chelating agent to the precipitation zone, and has a concentration in a range of 0.001-14 mol chelating agent/L.

13. The method of claim 12, wherein the chelating agent is at least one selected from the group consisting of ammonia hydroxide, ammonium chloride, ammonium sulfate, ammonium dihydrogen phosphate, ethylene glycol, carboxylic acids, ammonium nitrate, glycerol, 1,3 propane-diol, urea, N,N'-dimethylurea and quaternary ammonia salts.

14. The method of claim 1, wherein the drying is under vacuum at $N_2$, Ar or air atmosphere for 3-24 hours at a temperature between 80° C. and 2000° C.

15. The method of claim 1, wherein the lithium precursor is at least one selected from the group consisting of $LiOH.H_2O$, $Li_2CO_3$, $LiNO_3$, lithium acetate, lithium metal and $Li_2O$.

16. The method of claim 1, wherein when mixing with the lithium precursor, a ratio of lithium to metal cation is between 0.5-1.5.

17. The method of claim 1, wherein the precipitated particles are calcined at a temperature between 300-9500° C. for 2 to 48 hours.

18. The method of claim 1, wherein a ramp rate during calcining is 0.5 to 10 degrees per minute.

* * * * *